United States Patent Office 3,312,664
Patented Apr. 4, 1967

3,312,664
EPOXYLATED AMINOMETHYLDIPHENYL-OXIDES
Bart J. Bremmer, Midland, Mich., assignor to The Dow Chemical Company, Midland, Mich., a corporation of Delaware
No Drawing. Filed July 2, 1964, Ser. No. 380,022
9 Claims. (Cl. 260—47)

This invention relates to epoxy resins having relatively low viscosities which can be cured to produce thermoset resins having improved high temperature properties. More particularly this invention concerns epoxy resins having high epoxide functionality which are produced by the epoxylation of aminomethyldiphenyloxides.

Epoxy compounds made from aromatic amines such as aniline, methylenedianiline, phenylenediamine and p-aminophenol have been taught in the art. Epoxy resins based on these compounds are claimed in U.S. Patents 2,921,037, 2,951,822, and 2,951,825. Epoxy compounds made from aliphatic amines such as n-propylamine are also taught in the patent art as useful resin forming materials, however the properties of these resins at high temperatures are not as good as those of the resins made from aromatic amines.

The epoxylation of the aromatic amines having the amino nitrogen atom attached directly to a carbon atom of the aromatic nucleus to obtain resins having good properties at high temperatures is difficult in that the reaction between the epihalohydrin and amine must be continued for about five hours at a temperature below about 80° C. to avoid high epoxide equivalent weights. Reaction at these extended times sometimes results in a product having a high content of hydrolyzable halogen which tends to inhibit the catalytic cure of the resins. Additionally, resins having high hydrolyzable halogen contents have inferior electrical characteristics and high temperature properties.

Therefore, it is an object of this invention to produce an epoxy resin having improved high temperature properties. It is also an object to produce this improved resin by reacting the components thereof for a relatively short period of time, thereby obtaining a product having improved stability owing to its low epoxide equivalent weight and low hydrolyzable halogen content.

The epoxy resins prepared according to this invention are polyfunctional resins containing the diphenyl oxide moiety which provides good high temperature properties. Although the resins contain this aromatic group, the amine nitrogen atoms are connected to the aromatic group through a methylene group so that the amine can be epoxylated more easily than those having the amino nitrogen atom attached directly to the aromatic nucleus. Thus, polyfunctional epoxy resins having low epoxide equivalent weights and low hydrolyable halogen contents are easily prepared according to this invention.

These novel epoxy resins may be represented by the following formula:

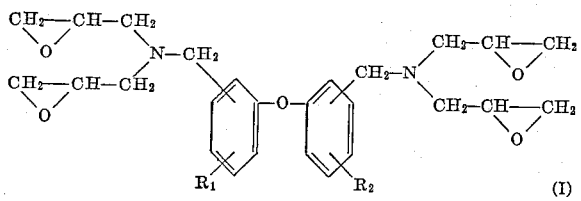

(I)

where $R_1$ and $R_2$ independently may be either hydrogen or diglycidyl amino methylene group having the following formula:

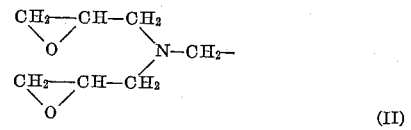

(II)

These resins can be prepared by the epoxylation of a mixture of aminomethylated diphenyl oxide. The functionality of the aminomethylated diphenyl oxide mixture may be an average from four to eight, depending upon the degree of chloromethylation of the diphenyl oxide used in preparing the amino compound. Thus, when $R_1$ and $R_2$ of Formula I are hydrogen, the amino compound used to produce the epoxy resin had a functionality of four. When both $R_1$ and $R_2$ are diglycidyl amino methylene groups the amino compound had a functionality of eight.

Aminomethylated diphenyl oxide can be obtained by the reaction of ammonia with chloromethylated diphenyloxide.

In the chloromethylation of diphenyloxide for the preparation of these resins a mixture of products typically is obtained. The distribution of a mixture containing 27.3 percent chlorine, which corresponds to the chlorine content of dichloromethylated diphenyloxide, is as follows:

| | |
|---|---:|
| Unreacted DPO[1] | 0.7 |
| Mono-ortho-CMDPO[2] | 1.2 |
| Mono-para-CMDPO | 6.9 |
| Ortho-para'-diCMDPO | 22.9 |
| para-para'-diCMDPO | 46.1 |
| Tri-CMDPO | 18.3 |
| Tetra-CMDPO | 1.9 |
| | 98.0 |

[1] DPO (diphenyloxide).
[2] CMDPO (chloromethylated diphenyloxide).

Thus the amine mixture produced by reacting this chloromethylated mixture with ammonia has an average functionality of about two. The epoxylation of an amine mixture such as this is described in the following example.

*Example 1*

A reactor was charged with one equivalent of aminomethyldiphenyloxide derived from a chloromethylated diphenyloxide mixture containing 27.3 percent chlorine and having a product distribution similar to that listed above and five equivalents of epichlorohydrin. The mixture was heated and maintained at a temperature of 70°±1° C. while a vacuum of 23–25 inches of mercury was held on the reactor. The mixture was cloudy at the start of the reaction but became clear after the exotherm subsided at the end of about 30 minutes. At that time the addition of 50 percent sodium hydroxide solution was started. The caustic was added slowly until 111 percent of the theoretical amount required for the epoxidation had been added. The azeotrope of epichlorohydrin and water which boiled off was condensed and separated, the epichlorohydrin being returned to the reactor and the water being removed. After all of the caustic had been added, the unreacted epichlorohydrin was removed by vacuum distillation and replaced by an equal amount of toluene. This lowered the viscosity of the product and made it possible to filter out the by-product salt. The toluene was then removed from the product which was recovered in a 93 percent yield. This epoxylated product was a relatively viscous, straw-colored resin having an epoxy equivalent weight of 137 and a hydrolyzable chlorine content of 0.14 percent.

The properties of this epoxy resin may be contrasted with those of a resin produced from similar reactants but reacted at 108° C. and atmospheric pressure. The resin was very viscous, had an epoxy equivalent weight of 165 and a hydrolyzable chlorine content of 1.25 percent.

The results of these and additional examples of the epoxylation of a mixture of aminomethyldiphenyloxides (AMDPO) are listed in Table 1. Except as noted for Examples 10 and 11, the AMDPO used in these examples was a mixture similar to that of Example 1 which had an average amino content corresponding to that of diaminomethyldiphenyloxide. Examples 10 and 11 used 4,4'-diaminomethyldiphenyloxide rather than the mixture having an average of two amino groups per molecule. All of these examples except number 3 as noted used five equivalents of epichlorohydrin per equivalent of AMDPO in the reaction mixture. The dehydrochlorination reactions in Examples 2–8 were conducted with 110 percent of the theoretical amount of sodium hydroxide.

TABLE 1.—EPOXYLATION OF DIAMINOMETHYLDIPHENYLOXIDE MIXTURES

| Example No. | Reaction Conditions | | | | EEW | Hydrolyzable Chlorine, Percent |
|---|---|---|---|---|---|---|
| | Initial | | After NaOH Addition | | | |
| | Temp., °C. | Hours | Temp., °C. | In. Hg Vac. | | |
| 1 | 70 | (1) | 70 | 23–25 | 137 | 0.14 |
| 2 | 80 | 5 | 108 | 0 | 165 | 1.25 |
| 3 [2] | 80 | 5 | 108 | 0 | 184 | 1.12 |
| 4 | 80 | 1 | 92–93 | 12–13 | 146 | 0.39 |
| 5 | [3] 75 | (1) | 92–93 | 12–13 | 114 | 0.51 |
| 6 | 75 | (1) | 70 | 23–24 | 137 | 0.16 |
| 7 | 75 | (1) | 70 | 23–24 | 142 | 0.06 |
| 8 | 75 | (1) | 70 | 23–24 | 145 | 0.56 |
| 9 [4] | 75 | (1) | 70 | 23–24 | 136 | 0.06 |
| 10 [5] | 75 | (1) | 70 | 22–24 | 141 | 0.35 |
| 11 [5] | 75 | (1) | 70 | 22–24 | 138 | 0.05 |

[1] No holding time—caustic addition started at the end of the initial exotherm.
[2] Ratio of epichlorohydrin to amino methyldiphenyloxide was 3.5.
[3] Temperature rose to 110° during exotherm.
[4] 115% of the theoretical amount of NaHO was used.
[5] 4,4'-diaminomethyldiphenyloxide used.
EEW—Epoxide equivalent weight.

From the data in Table 1 it can be seen that resins having low epoxide equivalent weight and low hydrolyzable chlorine content are obtained when the reaction temperature is kept below about 90° C. and preferably about 75° C. or lower. Additionally the reaction mixture should not be held at an elevated temperature for an extended period of time as is required in the epoxylation of amines having the amino nitrogen atom attached directly to an aromatic nucleus.

The viscosity of epoxy resins at temperatures below those where rapid curing takes place is an important factor in determining the workability of the resins. The viscosities of epoxylated AMDPO resins produced according of this invention and reported in Table 1 are listed in Table 2 along with the viscosity of an epoxylated novolac resin having an average of about 3.6 epoxy groups per molecule and tetraglycidyl oxydianiline. All of these resins listed in Table 2 have good high temperature properties, however high working temperatures of the uncured resins shorten their pot life.

TABLE 2.—VISCOSITY DATA OF HIGH TEMPERATURE EPOXY RESINS

| Temp., °F. | Example 8 | Example 11 | Epoxy Novolac | Tetraglycidyl oxydianiline |
|---|---|---|---|---|
| 77 | 140,400 | 77,200 | Solid | 207,000 |
| 100 | 24,000 | 16,800 | Solid | 31,200 |
| 120 | 9,700 | 6,080 | 75,000 | 8,250 |

Several of these epoxy resins having good high temperature properties were cured with 85 percent of the stoichiometric amount of the maleic anhydride adduct of methyl cyclopentadiene, known commercially as methyl Nadic anhydride, and their heat distortion temperatures determined. A resin according to Example 6 in Table 1 cured in this manner had a heat distortion value of 241° C. whereas the epoxy novolac of Table 2 had a value of 188° C., tetraglycidylmethylenedianiline resin, a value of 228° C. and triglycidyl-p-aminophenol resin a value of 215° C. Thus, under comparable curing conditions, the resins produced according to this invention have superior high temperature properties.

Any of the curing agents commonly used with epoxy resins may be used in curing these resins. The high temperature properties of the cured resins generally are better when the resins are cured with polycarboxylic acid anhydrides than with other curing agents such as polyamines, polyamides, boron trifluoride complexes and the like. The anhydrides are effective curing agents in amounts from 50 to 100 percent of the stoichiometric amount which will react with the polyepoxide, however it is preferred to use about 85 percent of the stoichiometric amount. Curing agents such as the amines generally are employed in stoichiometric amounts.

The epoxide prepared in Example 6 was cured with methylenedianiline, producing a resin having a heat distortion temperature of 196° C. whereas the epoxide of Example 10 cured with methylenedianiline had a heat distortion temperature of 211° C.

The percent weight loss of a thin film of cured resin after exposure to a temperature of 500° F. for 500 hours was determined for an epoxide such as that produced in Example 5 and for an epoxy novolac. When cured with methylene dianiline, the epoxide of Example 5 lost 12.6 percent of its original weight and the novolac lost 13.3 percent. The epoxide of Example 5 lost 16.4 percent when cured with $BF_3$ monoethylamine whereas the novolac lost 17.8 percent.

I claim:
1. An epoxy resin having the general formula

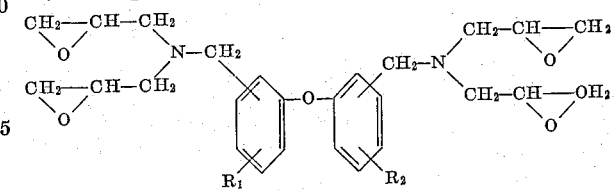

where $R_1$ and $R_2$ independently may be selected from the group consisting of hydrogen and the diglycidyl amino methylene group having the formula:

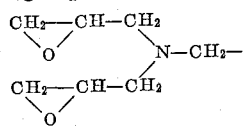

2. An epoxy resin according to claim 1 produced by the reaction of diaminomethyldiphenyloxide with epichlorohydrin at a temperature below 90° C.

3. An epoxy resin according to claim 1 produced by the reaction of 4,4'-diaminomethyldiphenyloxide with epichlorohydrin at a temperature below 90° C.

4. An epoxy resin according to claim 1 produced by the epoxylation of an amine mixture wherein said amine mixture is obtained by reacting ammonia with a mixture of mono-, di-, tri- and tetra-chloromethylated diphenyloxide containing about 27.3 weight percent chlorine.

5. A cured epoxy resin comprising a resin according to claim 1 reacted with a curing agent selected from the group consisting of polycarboxylic acid anhydrides, polyamines and boron trifluoride-amine complexes.

6. A cured epoxy resin according to claim 5 wherein said curing agent is the maleic anhydride adduct of methyl cyclopentadiene.

7. A cured epoxy resin accordance to claim 5 wherein said curing agent is methylenedianiline.

8. A cured epoxy resin according to claim 5 wherein said curing agent is the boron trifluoride monoethylamine adduct.

9. The process of producing an epoxy resin of the type set out in claim 1 comprising:

reacting a mixture of epichlorohydrin with diaminomethyldiphenyloxide at a temperature below about 90° C. until the reaction exotherm has subsided, slowly adding sodium hydroxide to said reaction mixture while refluxing said mixture and removing water therefrom, continuing the addition of said sodium hydroxide until an amount has been added which is equal to about 110 percent of the theoretical amount required to epoxidize the product of the reaction between epichlorohydrin and diaminomethyldiphenyloxide, thereafter recovering product resin from water, epichlorohydrin, sodium chloride and sodium hydroxide in said reaction mixture.

No references cited.

SAMUEL H. BLECH, *Primary Examiner.*

T. D. KERWIN, *Assistant Examiner.*